(12) United States Patent
Jang et al.

(10) Patent No.: US 12,174,681 B2
(45) Date of Patent: Dec. 24, 2024

(54) POWER SUPPLY DEVICE AND ELECTRONIC DEVICE COMPRISING SAME

(71) Applicant: SAMSUNG ELECTRONICS CO., LTD., Suwon-si (KR)

(72) Inventors: Duhee Jang, Suwon-si (KR); Kangmoon Seo, Suwon-si (KR); Sanghoon Lee, Suwon-si (KR); Jungho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 18/096,993

(22) Filed: Jan. 13, 2023

(65) Prior Publication Data

US 2023/0152874 A1 May 18, 2023

Related U.S. Application Data

(63) Continuation of application No. PCT/KR2021/008812, filed on Jul. 9, 2021.

(30) Foreign Application Priority Data

Jul. 14, 2020 (KR) .................... 10-2020-0086976

(51) Int. Cl.
*G06F 1/3218* (2019.01)
*G06F 1/3296* (2019.01)
*G10L 15/22* (2006.01)

(52) U.S. Cl.
CPC .......... *G06F 1/3218* (2013.01); *G06F 1/3296* (2013.01); *G10L 15/22* (2013.01); *G10L 2015/223* (2013.01)

(58) Field of Classification Search
CPC ..... G06F 1/3218; G06F 1/3296; G10L 15/22; G10L 2015/223
See application file for complete search history.

(56) References Cited

U.S. PATENT DOCUMENTS 7,933,131 B2    4/2011   Cho et al.
8,890,487 B2   11/2014   Jung et al.
(Continued)

FOREIGN PATENT DOCUMENTS

CN   108877802 A   11/2018
EP   1 057 652 B1  10/2004
(Continued)

OTHER PUBLICATIONS

International Search Report and Written Opinion dated Oct. 19, 2021, issued by the International Searching Authority in International Application No. PCT/KR2021/008812 (PCT/ISA/220, 210, 237).

*Primary Examiner* — Nimesh G Patel
(74) *Attorney, Agent, or Firm* — Sughrue Mion, PLLC

(57) ABSTRACT

An electronic device comprising: a power supply apparatus including a first converter configured to generate driving power and a second converter configured to generate first standby voltage and second standby voltage; and a main body operated based on the driving power and the second standby power received from the power supply apparatus. The second converter is configured to: during a normal mode operation and a standby mode operation, obtain the first standby voltage and adjust the first standby power based on the obtained standby power; and during the standby mode operation, obtain the second standby voltage; and in response to the obtained second standby voltage being equal to or less than a reference level, perform the normal mode operation to control the first standby voltage to be maintained at a first voltage level and control the second standby voltage to be maintained at a second voltage level.

20 Claims, 14 Drawing Sheets

(56) References Cited

U.S. PATENT DOCUMENTS

| | | |
|---|---|---|
| 9,030,049 B2 | 5/2015 | Lai |
| 9,099,927 B2 | 8/2015 | Choi |
| 9,444,251 B2 | 9/2016 | Woo et al. |
| 2008/0151455 A1 | 6/2008 | Ren |
| 2013/0127248 A1* | 5/2013 | Lai .................. H02J 9/005 |
| | | 307/31 |
| 2014/0281630 A1* | 9/2014 | Chien ............. G06F 1/3296 |
| | | 713/323 |
| 2014/0368179 A1* | 12/2014 | Lee .................. H02J 9/005 |
| | | 323/304 |
| 2016/0065000 A1 | 3/2016 | Maeda |
| 2016/0240194 A1* | 8/2016 | Lee ................ G06F 1/3293 |
| 2019/0252006 A1* | 8/2019 | Mori ............. G11C 11/4094 |
| 2019/0355365 A1* | 11/2019 | Kim .............. G06F 1/3209 |
| 2021/0195274 A1 | 6/2021 | Wang et al. |
| 2024/0048055 A1* | 2/2024 | Jang ................ H02M 1/0032 |

FOREIGN PATENT DOCUMENTS

| | | |
|---|---|---|
| JP | 6-327249 A | 11/1994 |
| JP | 2001-45678 A | 2/2001 |
| JP | 2006-67703 A | 3/2006 |
| JP | 2016-181088 A | 10/2016 |
| KR | 10-0840638 B1 | 6/2008 |
| KR | 10-1144969 B1 | 5/2012 |
| KR | 10-2012-0072933 A | 7/2012 |
| KR | 10-1925142 B1 | 2/2019 |

\* cited by examiner

FIG. 5

| STBY | Vs2 | OMD | Operation Mode |
|---|---|---|---|
| H | – | L | NR |
| L | H | H | STB |
| L | L | L | NR |

POWER SUPPLY DEVICE AND ELECTRONIC DEVICE COMPRISING SAME

CROSS-REFERENCE TO RELATED APPLICATIONS

This application is a by-pass continuation application of International Application No. PCT/KR2021/008812, filed on Jul. 9, 2021, which claims priority to Korean Patent Application No. 10-2020-0086976, filed on Jul. 14, 2020, in the Korean Intellectual Property Office, the disclosures of each of which are incorporated by reference herein in their entireties.

BACKGROUND

1. Field

Apparatuses consistent with example embodiments of the present disclosure relate to a power supply apparatus which generates at least two types of standby voltages with less power consumption and controls the at least two types of standby voltages not to excessively rise or fall, and an electronic device including the same.

2. Description of Related Art

With the advancements of the electronic technology, various types of electronic devices have been developed. For example, in the case of televisions (TVs, as the demand for large TVs has increased, large-sized TVs that require high power consumption efficiency have been developed. Furthermore, to improve the space usability and aesthetics of such TVs, active research to reduce the thickness of TVs has been conducted. However, there are limitations on how small components of TVs may be reduced. For example, an electronic device includes a power supply unit to supply power to each component of the electronic device. The power supply unit includes circuit elements having a large volume, for example, a transformer. Therefore, there is a limitation in miniaturization of the power supply unit. Accordingly, the volume of an electronic device may be reduced by providing, externally to the electronic device, a power supply apparatus that functions as a power board. Recently, some functions of electronic devices have been transferred to the power supply apparatus. Accordingly, the power supply apparatus may generate at least two types of standby power such as standby power provided to the electronic device and standby power for internal use.

SUMMARY

Provided are a power supply apparatus which generates at least two types of standby power with less power consumption and controls the at least two types of standby power not to excessively rise or fall, and an electronic device including the same.

According to an aspect of the disclosure, an electronic device includes: a power supply apparatus including a first converter configured to generate driving power and a second converter configured to generate first standby voltage and second standby voltage; and a main body configured to be operated based on the driving power and the second standby power received from the power supply apparatus, wherein the second converter is configured to: during a normal mode operation and a standby mode operation, obtain the first standby voltage and adjust the first standby power based on the obtained standby power, during the standby mode operation, obtain the second standby voltage, and in response to the obtained second standby voltage being equal to or less than a reference level, perform the normal mode operation to control the first standby voltage to be maintained at a first voltage level and control the second standby voltage to be maintained at a second voltage level.

The second converter may be further configured to obtain the second standby voltage during the normal mode operation in a standby mode state, and in response to the obtained second standby voltage being greater than the reference level, switch from the normal mode operation to the standby mode operation.

The second converter may be further configured to: generate the first standby power based on a first ground; and generate the second standby power based on second ground, where the second ground is different from the first ground and earth ground.

The main body may be configured to perform a voice recognition function based on the second standby voltage in a standby mode state.

The main body may be configured to extract a power-on command from a voice of a user by performing a voice recognition function based on the second standby voltage in which the main body is in a power off state, and wherein the main body is powered on based the power-on command.

The power supply apparatus may further include: a main module configured to be operated based on the first standby voltage and configured to output a standby mode signal indicating a standby mode state when the main body is powered off.

The first converter may be further configured to: based on the standby mode signal, enter the standby mode state in which the driving power is not generated, and maintain the standby mode state while the second converter performs the normal mode operation based on a result of the obtained the second standby voltage.

The main module may be further configured to receive an input signal from an external device and provide the input signal to the main body.

The second converter may include a conversion circuit configured to generate the first standby voltage and the second standby voltage based on switching operations of at least two switching elements, and the second converter may be further configured to: control the at least two switching elements to continuously perform the switching operation during the normal mode operation, and control the at least two switching elements to intermittently perform the switching operation during the standby mode operation.

The second converter may include an output portion configured to output the first standby voltage through both terminals, a resistor is connected between both terminals, and in response to the second standby voltage being greater than the reference level, a current flows via the resistor.

The main body may include: a display; a power circuit portion configured to convert the driving power received from the power supply apparatus, and output the converted driving power; a driving module configured to control driving of the display based on the converted driving power; and a main module operated based on the converted power or the second standby power.

The power supply apparatus may be configured to provide, to the main body, the driving power, the second standby voltage, and a signal received from an external device, via a cable.

According to one or more embodiments, a power supply apparatus includes: a first converter configured to generate a driving voltage in a normal mode state, and stop one or more operations of the first converter in a standby mode state; and a second converter configured to generate a first standby voltage and a second standby voltage by performance of a standby mode operation in the standby mode state, obtain the first standby voltage to control rising or falling of the first standby voltage, obtain the second standby voltage, and in response to the second standby voltage being equal to or less than a reference voltage, perform a normal mode operation.

The second converter may be further configured to generate the first standby voltage and the second standby voltage based on a first ground for the first standby voltage and a second ground for the second standby voltage, wherein the first ground is different than the second ground.

The power supply further may include a function module configured to: operate based on the second standby voltage; receive an input signal from a second external device through wired or wireless communication; and provide, to a first external device, the driving voltage, the second standby voltage, and the input signal via a cable, where the power supply apparatus is connected to a first ground and the first external device is connected to a second ground, and where the first ground is different than the second ground.

According to an aspect of the disclosure, an electronic device includes: a power supply apparatus including a first converter configured to generate driving power and a second converter configured to generate first standby voltage and second standby voltage; and a display device operated based on the driving power and the second standby power received from the power supply apparatus, where the second converter is configured to: during a normal mode operation and a standby mode operation, obtain the first standby voltage and adjust the first standby power based on the obtained standby power, and during the standby mode operation, obtain the second standby voltage, and in response to the obtained second standby voltage being equal to or less than a reference level, perform the normal mode operation to control the first standby voltage to be maintained at a first voltage level and control the second standby voltage to be maintained at a second voltage level.

The second converter may be further configured to obtain the second standby voltage during the normal mode operation in a standby mode state, and in response to the obtained second standby voltage being greater than the reference level, switch from the normal mode operation to the standby mode operation.

The second converter may be further configured to: generate the first standby power based on a first ground; and generate the second standby power based on second ground, where the second ground is different from the first ground and earth ground.

The display device may be configured to perform a voice recognition function based on the second standby voltage in the standby mode state.

The display device may be configured to extract a power-on command from a voice of a user by performing a voice recognition function based on the second standby voltage in which the display device is in a power off state, and wherein the display device may be powered on based the power-on command.

A power supply apparatus according to the technical concepts of the present disclosure and an electronic device including the same advantageously reduces the standby power as one power unit generates at least two types of standby power. Furthermore, the power supply apparatus and the electronic device including the same may generate at least two standby power voltages by performing a standby mode operation in a standby mode state, control the operation of a power unit based on one of the at least two standby power voltages, and sense the other of the at least one standby power voltage to perform a normal mode operation when the other of the at least one standby power voltage decreases equal to or less than a certain level, thereby preventing the at least two types of standby power from excessively rising or falling.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 is a table for describing an example of a method of setting an operation mode in an operation mode setting circuit of FIG. 4, according to an embodiment of the present disclosure;

DETAILED DESCRIPTION

Figure 1:
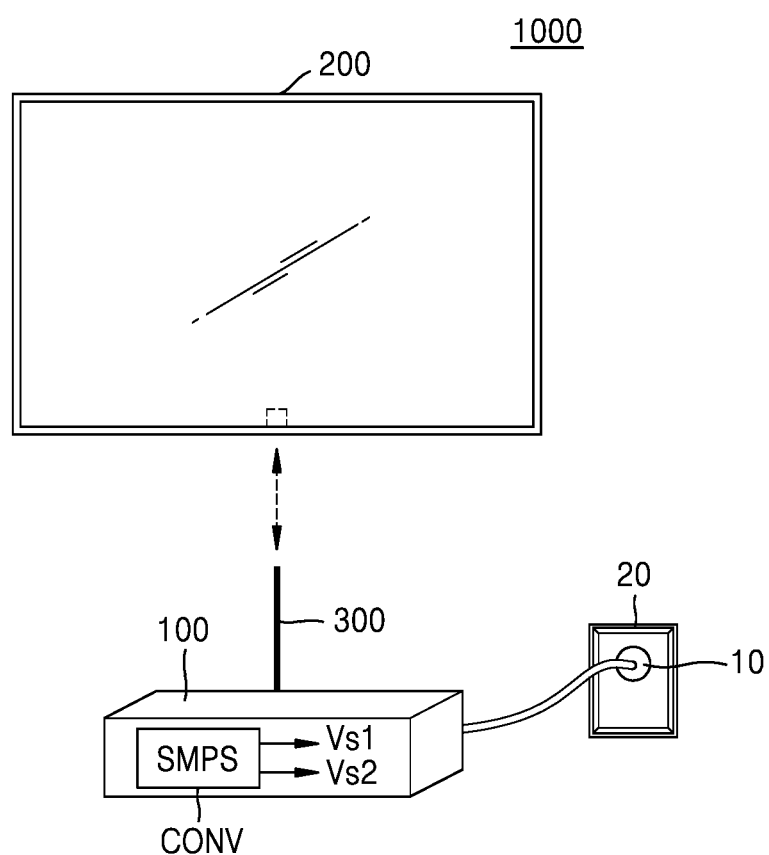
FIG. 1 schematically illustrates the configuration of an electronic device according to an example embodiment of the present disclosure.

Various embodiments of the disclosure and terms used therein are not intended to limit the disclosure to particular modes of practice, and it is to be appreciated that various modifications, equivalents, and/or alternatives that do not depart from the spirit and technical scope of the disclosure are encompassed in the disclosure. Throughout the specification and drawings, like reference numerals may be used to denote like elements or components. An expression used in the singular form in the specification also includes the plural form unless clearly specified otherwise in the context. In the specification, the expressions such as "A or B," "at least one of A and/or B," or "at least one or more of A and/or B" may include all available combinations of items listed together. Terms such as "first" and "second" are used herein merely to describe a variety of constituent elements, but the constituent elements are not limited by the terms. Such terms are used only for the purpose of distinguishing one constituent element from another constituent element. For example, a first user device and a second user device may denote different user devices regardless of order or importance When a constituent element, for example, a first constituent element, is "coupled with/to" or is "connected to" another constituent element, for example, a second constituent element, with or without terms such as "operatively" or "communicatively," the constituent element contacts or is connected to the other constituent element directly, for example, by wire, or through a third constituent elements, for example, wirelessly.

In the disclosure, a "module" or "portion" may perform at least one of functions or operations, and may be implemented by hardware or software or a combination of hardware and software. Furthermore, a plurality of "modules" or a plurality of "portions" may be integrated into at least one of modules to be implemented as at least one of processors, except a "module" or "portion" that needs to be implemented as specific hardware.

Hereinafter, various embodiments of the disclosure are described in reference to the accompanying drawings.

FIG. 1 schematically illustrates the configuration of an electronic device according to an example embodiment of the present disclosure.

Referring to FIG. 1, an electronic device 1000 may include a main body 200 and a power supply apparatus 100, where the main body 200 and the power supply apparatus 100 may be connected to each other via a cable 300. In one or more embodiments, the cable 300 may include an optical cable or any other wiring cable known to one of ordinary skill in the art.

In one or more embodiments, the electronic device 1000 may be a display system, and the main body 200 may be a display device, for example, a TV, a monitor, an electronic blackboard, or any other display device known to one of ordinary skill in the art. However, the disclosure is not limited thereto, and the electronic device 1000 may be multimedia devices of various types. In the disclosure below, the main body 200 is described as a TV, for example.

The power supply apparatus 100 may generate driving power and at least two standby voltages based on commercial power, and provide the driving power and at least one standby voltage to the main body 200 via the cable 300.

In one or more examples, a ground of the power supply apparatus 100 may be different from a ground of the main body 200. Accordingly, the power supply apparatus 100 may provide a floating ground, and generate at least two standby voltages based on different grounds. In one or more embodiments, the power supply apparatus 100 may generate the driving power and the at least one standby voltage provided to the main body 200 based on the same ground.

For example, a power plug 10 of the power supply apparatus 100 may be connected to a power outlet 20 to receive a commercial voltage. The commercial voltage may generally be an AC voltage, but a DC voltage is possible. The power supply apparatus 100 may generate a driving voltage and first and second standby voltages Vs1 and Vs2 by converting the commercial voltage. The driving voltage may be relatively higher than the first and second standby voltages Vs1 and Vs2.

The power supply apparatus 100 may include a function unit, and the function unit may operate based on the first standby voltage Vs1. The power supply apparatus 100 may provide the driving voltage and the second standby voltage Vs2 to the main body 200.

The main body 200 may not include a power line or any other line for connecting to the power outlet that provides the commercial power. Instead, the main body 200 may be operated based on the driving voltage and the second standby voltage Vs2 received from the power supply apparatus 100. The main body 200 may be operated based on the driving voltage in a normal mode state, and based on the second standby voltage Vs2 in a standby mode state. The normal mode state and the standby mode state may refer to states of the overall components of the electronic device 1000.

The power supply apparatus 100 may include a converter CONV implemented by an insulation type switched mode power supply (SMPS), and the converter CONV may generate at least two standby voltages. For example, the two standby voltages may include the first standby voltage Vs1 and the second standby voltage Vs2. The converter CONV may generate the first standby voltage Vs1 and the second standby voltage Vs2 through a switching operation, and in a normal mode state, perform a normal mode operation of continuously performing a switching operation, and in a standby mode state, perform a standby mode operation of intermittently performing a switching operation. Accordingly, in the standby mode state, power consumption according to the switching operation of the converter CONV may be advantageously reduced.

The first standby voltage Vs1 may be set as a master voltage, and the second standby voltage Vs2 may be set as a slave voltage. When performing the normal mode operation and the standby mode operation, the converter CONV may sense (e.g., obtain) the first standby voltage Vs1 and control (e.g., adjust) the first standby voltage Vs1 based on a sensing result (e.g., based on the obtained first standby voltage Vs1). The converter CONV may control the switching operation, for example, a switching frequency, to prevent the first standby voltage Vs1 from falling equal to or less than a certain lower limit voltage or rising over a certain upper limit voltage. For example, the lower limit voltage and the upper limit voltage may be set based on a target voltage and a voltage margin of the first standby voltage Vs1.

Furthermore, when performing the standby mode operation, the converter CONV may sense the second standby voltage Vs2, and when the second standby voltage Vs2 is a certain reference voltage or less, perform the normal mode operation. For example, even when the power supply apparatus 100 is in the standby mode state, the converter CONV may perform the normal mode operation when the second standby voltage Vs2 is a reference voltage or less.

As described above, in the standby mode state, the main body 200 may be operated base on the second standby voltage Vs2. When some functions with a small load current is performed in the main body 200, even when the converter CONV intermittently performs a switching operation, the second standby voltage Vs2 may not be lowered too much. A small load current may be determined when the current is below a current threshold.

However, when the main body 200 performs a function in the standby mode state, such as voice recognition, which consumes a large load current, the second standby voltage Vs2 may be rapidly lowered. When the power consumption of the power supply apparatus 100 is low in the standby mode state (e.g., a load current is small), variation of the first standby voltage Vs1 may be low. In the standby mode state, when the converter CONV senses the first standby voltage Vs1 only and controls the switching operation based on a sensing result, the second standby voltage Vs2 may fall.

However, in the power supply apparatus 100, according to one or more embodiments of the present disclosure, when performing the standby mode operation, the converter CONV may sense the second standby voltage Vs2, and when the second standby voltage Vs2 is a certain reference voltage or less, perform the normal mode operation. Therefore, in the standby mode state, the first standby voltage Vs1 and the second standby voltage Vs2 may be prevented from being excessively decreased or increased.

Figure 2:
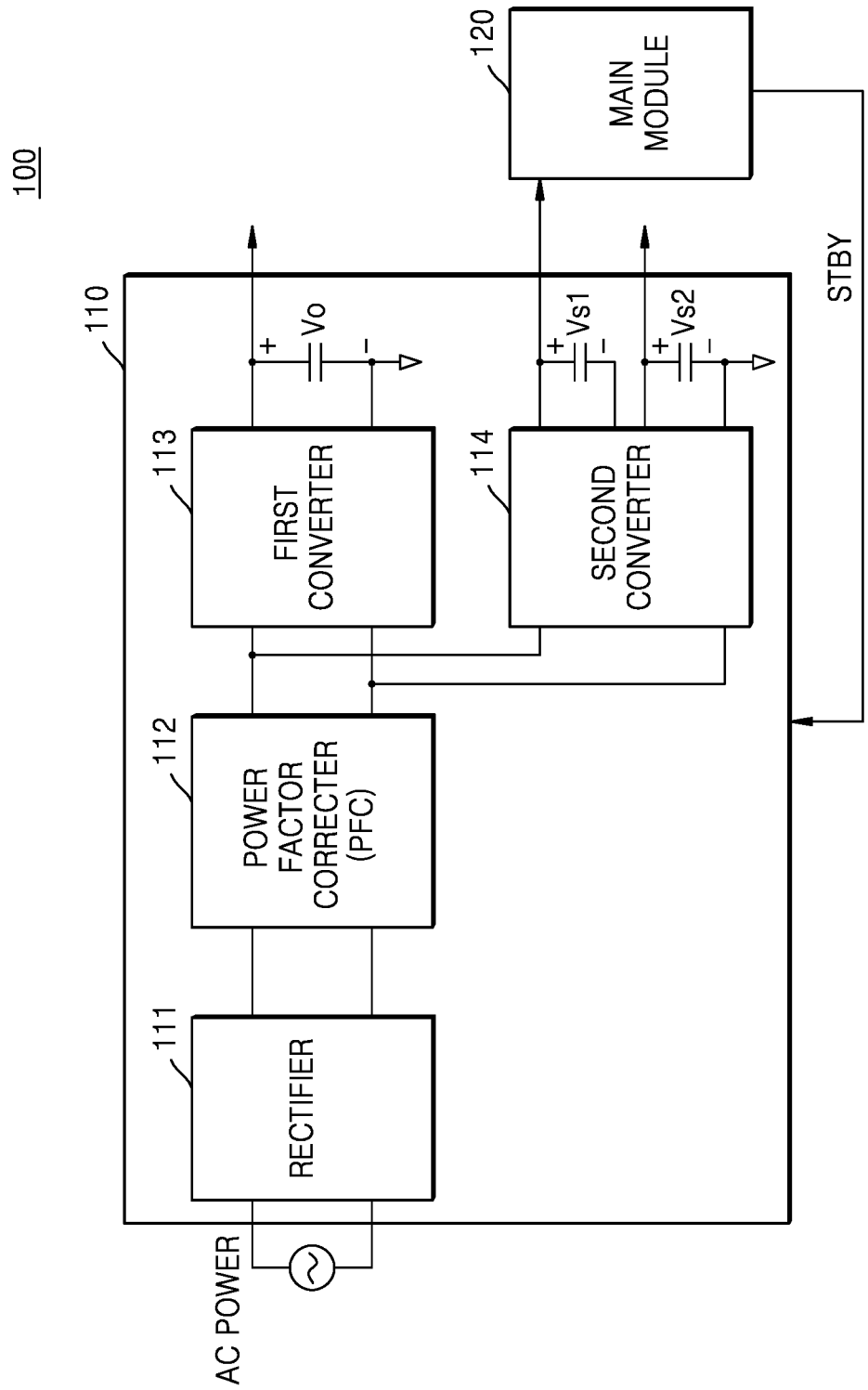
FIG. 2 is a schematic block diagram of a power supply apparatus according to an example embodiment of the present disclosure.

FIG. 2 is a schematic block diagram of a power supply apparatus, according to an example embodiment of the present disclosure. The power supply apparatus 100 may be applied to the electronic device 1000 of FIG. 1.

Referring to FIG. 2, the power supply apparatus 100 may include a power generation module 110 and a main module 120 (e.g., a main module of the power supply apparatus 100), and the power generation module 110 may include a rectifier 111, a power factor corrector (PFC) 112, a first converter 113, and a second converter 114.

The rectifier 111 may convert an input AC voltage into a DC voltage. The rectifier 111 may convert an AC voltage into a DC voltage of a certain level by performing a rectifying and smoothing operation. A half wave or full wave circuit, for example, a bridge circuit, may be used for rectification, and a capacitor may be connected in parallel to an output terminal of the rectifier 111 for smoothing.

The power factor corrector 112 may adjust a power factor of a DC voltage output form the rectifier 111, and output a DC voltage with an adjusted power factor. The power factor corrector 112 may minimize an invalid power value by correcting the phase and shape of the DC voltage output from the rectifier 111. The power factor corrector 112 may output the DC voltage through a capacitor connected to the output terminal.

According to one or more embodiments, the power factor corrector 112 may be turned on or off. When the power factor corrector 112 is turned on (e.g., activation), the DC voltage with the minimized invalid power value generated in the power factor corrector 112 is output to the first converter 113 and the second converter 114. When the power factor corrector 112 is turned off (e.g., deactivation), the rectified DC voltage that is output from the rectifier 111 may be provided to the second converter 114. In one or more embodiments, when the power factor corrector 112 is turned off, the first converter 113 may also be turned off.

The first converter 113 may generate a driving voltage Vo (e.g., driving power), by converting an input DC voltage. The first converter 113 may be an insulation type converter. In one or more embodiments, the first converter 113 may be implemented as an SMPS including a transformer, and the primary side (e.g., input portion) and the secondary side (e.g., output portion) may be insulated by the transformer. The transformer may include a primary winding and a secondary winding that are wound around a core (e.g., magnetic core). When a current change occurs in the primary winding, an induced electromotive force may be generated in the secondary winding due to a change in magnetic flux passing through the core, and thus, an induction current may flow.

The second converter 114 may generate the first standby voltage Vs1 and the second standby voltage Vs2 (e.g., at least two standby voltages), by converting an input DC voltage. The second converter 114 may be an insulation type converter, and may be implemented as an SMPS including a transformer.

In one or more embodiments, the first standby voltage Vs1 and the second standby voltage Vs2 may be voltages based on different grounds. For example, the first standby voltage Vs1 may be a voltage based on a first ground, and the second standby voltage Vs2 may be a voltage based on a second ground. The second ground may be different from the first ground and earth ground.

In one or more embodiments, the main body (200 of FIG. 1) may be connected to the second ground, and the driving voltage Vo and the second standby voltage Vs2 provided to the main body (200 of FIG. 1) may be voltages based on the second ground.

The driving voltage Vo and the second standby voltage Vs2 may be provided to the main body (200 of FIG. 1), and the first standby voltage Vs1 may be provided to the main module 120.

The main module 120 may be operated based on the first standby voltage Vs1, and may control the overall operation of the power supply apparatus 100. The main module 120 may be a function module that controls or performs a plurality of functions provided by the power supply apparatus 100. The main module 120 may generate a standby mode signal STBY representing a standby mode (e.g., a standby mode state) or a normal mode (e.g., a normal mode state). For example, when the standby mode signal STBY is a logic high level H, the standby mode signal STBY represents a normal mode, and when the standby mode signal STBY is a logic low level L, the standby mode signal STBY represents a standby mode. In one or more embodiments, when the main body (200 of FIG. 1) is powered off, the main module 120 may generate the standby mode signal STBY of the logic low level L, and when the main body 200 is powered on, the main module 120 may generate the standby mode signal STBY of the logic high level H. For example, the power-on or power-off state of the main body 200 may be received by the power supply apparatus 100 from the main body 200 via the cable 300.

In the normal mode, the components of the power supply apparatus 100, for example, the power generation module 110 and the main module 120, may be normally operated. For example, in this mode, the rectifier 111, the power factor corrector 112, the first converter 113 and the second converter 114, and the function module 120 of the power generation module 110 may be operated.

In response to the standby mode signal STBY of the logic low level L, the power supply apparatus 100 may enter a standby mode. In the standby mode, the rectifier 111 and the second converter 114 may be operated (e.g., activated), and the power factor corrector 112 and the first converter 113 may not be operated (e.g., deactivated). In other words, the power factor corrector 112 and the first converter 113 may be turned off.

In the standby mode, the main module 120 may stop performing most functions, and only some functions of receiving a user input signal (e.g., a remote controller signal) may be activated. Accordingly, the power consumption of the power supply apparatus 100 in the standby mode may be very small compared to the normal mode. For example, the power consumption may be 0.5 W (watt) or less.

In one or more embodiments, the main module 120 may include an interface unit, and may be connected to an external apparatus via the interface unit in a wireless or wired manner. For example, the interface unit may communicate with an external device in a wired method based on a radio frequency (RF) cable, a high definition multimedia interface (HDMI), a digital visual interface (DVI), a component, a wired Ethernet, or any other wired connection known to one of ordinary skill in the art. In a wireless method, the interface unit may communicate with the external device based on wireless fidelity (Wi-Fi), an antenna, Bluetooth, or any other wireless communication method known to one of ordinary skill in the art.

In one or more embodiments, the interface unit may be implemented as an input terminal according to the HDMI standard, and may be connected to a set top box to receive an input signal. The interface unit may be implemented as a Wi-Fi communication module to receive contents by receiving an input signal from various streaming services. The function module 120 may provide the received input signal to the main body 200.

When the first standby voltage Vs1 and the second standby voltage Vs2 are generated in the respective separate converters, power consumption in the standby mode state may be increased by the switching operation performed in each converter. Therefore, standby power regulation may not be satisfactory.

However, in the power supply apparatus 100, according to one or more embodiments, as one converter (e.g., the second converter 114), may generate a plurality of standby voltages (e.g., the first standby voltage Vs1 and the second standby voltage Vs2), the power consumption in the standby mode state may be reduced. Therefore, the standby power regulation may provide advantageous power savings compared to the normal mode.

In the standby mode state, as the second converter 114 feeds back the first standby voltage Vs1 that may be set to be a master voltage, to control the first standby voltage Vs1, and furthermore, senses the second standby voltage Vs2 that may be set to be a slave voltage and performs a standby mode operation based on a sensing result, or forcibly releases the standby mode state and performs a normal mode operation, the first standby voltage Vs1 and the second standby voltage Vs2 may be maintained at constant levels in the standby mode state.

Figure 3:
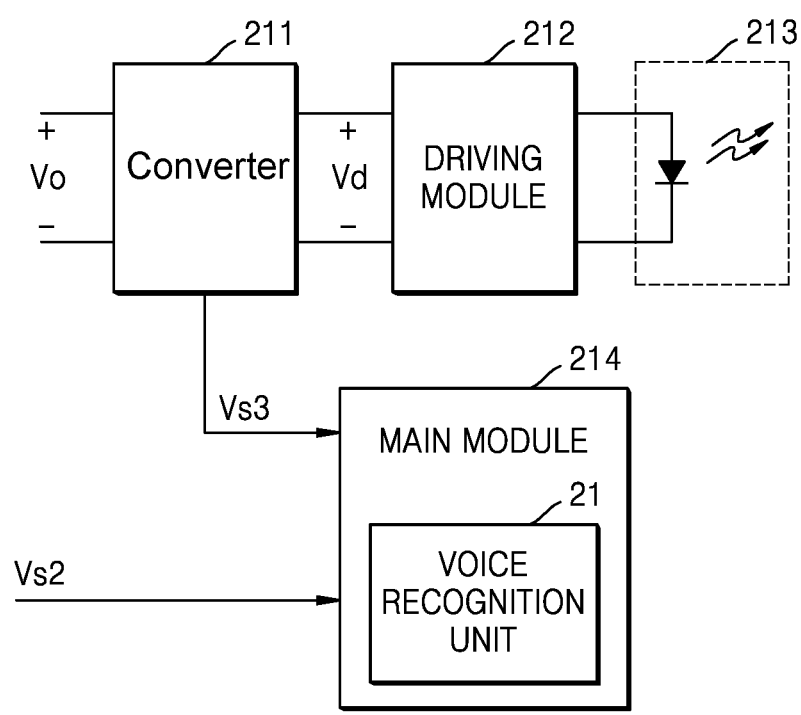
FIG. 3 is a schematic block diagram of an example of a main body of FIG. 1.

FIG. 3 is a schematic block diagram of one or more examples of the main body of FIG. 1.

Referring to FIG. 3, the main body 200 may include a converter 211, a driving module 212, a display 213, and a main module 214 (e.g., the main module of the main body 200), and may further include one or more other general-purpose components, for example, a user input portion, a sensor, or any other suitable components known to one of ordinary skill in the art.

The converter 211 may convert the driving voltage Vo that is received and provide the converted voltages (e.g., Vd and Vs3) to the constituent elements of the main body 200 (e.g., the driving module 212 and the main module 214). In one or more embodiments, the converter 211 and the driving module 212 may be operated in a normal mode state (e.g., the normal mode state of the main body 200).

The driving module 212 may drive the display 213. For example, the driving module 212 may drive each pixel by applying a driving voltage to or flowing a driving current in each pixel constituting the display 213 under the control of the main module 214. The display 213 may be referred to as a display panel, and the driving module 212 may be referred to as a panel driver, or any other driver known to one of ordinary skill in the art. In the following description, for convenience of explanation, both may be collectively referred to as the display 213 and the driving module 212.

The display 213 may be implemented as a liquid crystal display (LCD), an organic LED (OLED) an active-matrix OLED (AMOLED), a plasma display panel (PDP), a quantum dot (QD), a micro LED, or any other display known to one of ordinary skill in the art, and may be additionally implemented as various types flat-panel displays or flexible displays.

The main module 214 may include at least one of a central processing unit (CPU), a micro-controller unit (MCU), a micro-processing unit (MPU), a controller, an application processor (AP), or a communication processor (CP), or an ARM processor, or may be defined by a corresponding term. Furthermore, the main module 214 may be implemented as a system on chip (SoC) including a processing algorithm or a large scale integration (LSI), and may be implemented in the form of a field programmable gate array (FPGA).

The main module 214 may be operated in the normal mode state based on a driving voltage Vs3 that may be converted and received from the converter 211, and in the standby mode state based on the second standby voltage Vs2 that is received. The main module 214 may include a plurality of function units, and in the normal mode state, may perform a normal operation as power, for example, the converted driving voltage Vs3, may be applied to at least one function unit. In the standby mode state, the standby voltage (e.g., the second standby voltage Vs2), may be applied to some of the function units of the main module 214. For example, the standby voltage may be applied to a function unit for receiving a user input such as an on/off signal or a user voice input from a remote controller, whereas most other function units may be in a power-off state because power thereto is cut off. In one or more embodiments, the main module 214 may include a voice recognition unit 21. The voice recognition unit 21 in the normal mode state may perform a voice recognition function based on the converted driving voltage Vs3. The voice recognition unit 21 may extract information from a user's voice by recognizing the user's voice. For example, the voice recognition unit 21 may extract a control command from the user's voice, and the main module 214 may be operated based on the extracted control command.

Furthermore, the voice recognition unit 21 in the standby mode state may perform a voice recognition function based on the second standby voltage Vs2. For example, in the standby mode state, when the main body 200 is powered off, except some of the function units of the main module 214 including the voice recognition unit 21, other function units for receiving a user input, the components of the main body 200 (e.g., other function units of the main module 214, the converter 211, the driving module 212, and the display 213) may not be operated.

In the standby mode state, for example, in the power-off state of the main body 200, as the voice recognition unit 21 performs voice recognition, a power-on command may be extracted from the user's voice. For example, the voice recognition unit 21 may receive the user's voice, and extract from the user's voice a triggering word indicating power-on (e.g., "power-on" or "turn-on,") as the power-on command. The triggering word may be referred to as a wakeup command as a call to the voice recognition function of the main body 200, for example, "Hi, Bixby," "Ok Google," "Alexa," or any other wakeup command known to one of ordinary skill in the art.

The main body 200 may be powered on based on the power-on command extracted from the voice recognition unit 21. For example, the main module 214 may perform a normal operation in response to the power-on command. Furthermore, the power-on command may be provided to the power supply apparatus (100 of FIGS. 1 and 2), where the power supply apparatus 100 may perform a normal operation in response to the power-on command, and the driving voltage Vo may be received from the power supply apparatus 100. Therefore, when switching to the normal operation the converter 211, the driving module 212, and the display 213 may be operated based on the received driving voltage Vo.

When the voice recognition unit 21 performs a voice recognition function in the standby mode state, the power consumption of the main body 200 in the standby mode state may be increased. Accordingly, as described above with reference to FIGS. 1 and 2, in the power supply apparatus (100 of FIGS. 1 and 2), a converter (e.g., the second converter 114 of FIG. 2) that generates the second standby voltage Vs2 may sense the second standby voltage Vs2 to prevent the second standby voltage Vs2 from excessively falling, and when the second standby voltage Vs2 is a certain reference voltage or less, may switch from the standby mode to the normal mode to perform a normal mode operation.

The main module 214 may further include general-purpose components, for example, a user command receiving unit, a processor, and a memory. The user command receiving unit may receive a command or data used for a constituent element, (e.g., a processor) of the main body 200 from the outside of the main body 200 (e.g., a user). The user command receiving unit may include, for example, a microphone for receiving voice uttered by a user and corresponding to a menu or function of the main body 200, a camera for capturing an image corresponding to the motion of a user, and a remote signal receiving unit for receiving an optical signal corresponding to a user input (e.g., touch, press, touch gesture, voice, or motion).

In one or more embodiments, the user command receiving unit may receive a control command from a remote control device (e.g., a remote controller) through a short-range wireless communication interface, such as a Bluetooth, near field communication (NFC), or infrared (IR) transceiver, or any other short-range wireless communication method known to one of ordinary skill in the art, and transmit the received control command to the processor. For example, the user command receiving unit may receive a control command to allow the main body 200 to enter the normal mode state or the standby mode state, and transmit the received control command to the processor. In addition, the user command receiving unit may receive a control command to request entering various types of modes according to the functions provided by the main body 200, such as an off mode, a sleep mode, an ambient mode, or any other functional mode known to one of ordinary skill in the art.

The processor may control the overall operation of the main body 200. For example, the processor may copy various software programs or instructions stored in the memory to RAM, and execute the copied programs or instructions to perform various operations.

The memory may store various software programs (or applications) for the operation of the main body 200, and data and instructions for the operation of the main body 200. At least part of the program may be downloaded from an external server through wireless or wired communication or provided from the power supply apparatus (100 of FIG. 1). The memory may be accessed by the processor, and the processor may perform read/record/modify/delete/update, and the like of the software program, data, and instructions included in memory.

Figure 4:
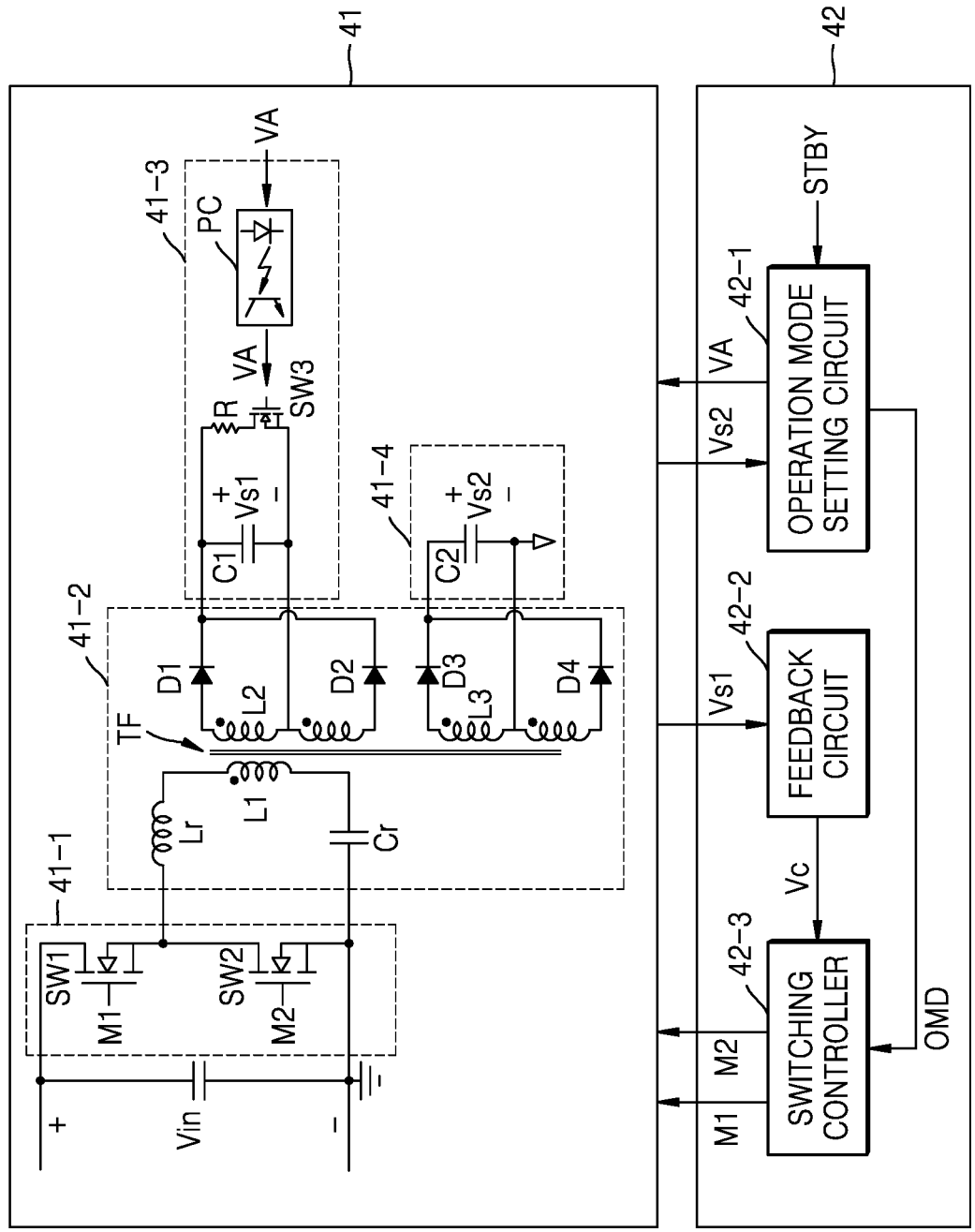
FIG. 4 illustrates a second converter according to an example embodiment of the present disclosure.

FIG. 4 illustrates a configuration of the second converter 114 according to an example embodiment of the present disclosure.

The second converter 114 may be applied to the power supply apparatus 100 of FIG. 2.

The second converter 114 may include a conversion circuit 41 and a controller 42. The conversion circuit 41 may include a switching portion 41-1, a transformation portion 41-2, a first output portion 41-3, and a second output portion 41-4.

The switching portion 41-1 may include first and second switching elements SW1 and SW2, and the first and second switching elements SW1 and SW2 may be turned on and off based on switching signals M1 and M2, respectively. In one or more examples, the first and second switching elements SW1 and SW2 may be alternately turned on and turned off.

The transformation portion 41-2 may include a leakage inductor Lr, a transformer TF, a resonance capacitor Cr, and first to fourth diodes D1, D2, D3, and D4.

The first and second switching elements SW1 and SW2 may be serially connected to each other in response to an input voltage Vin, and the leakage inductor Lr and the leakage inductor Lr may be connected between the second switching element SW2 and a primary coil L1 of the transformer TF. The leakage inductor Lr may serve as a resonance inductor of the transformer TF.

A secondary coil L2 may be connected to first and second diodes D1 and D2, and a tertiary coil L3 may be connected to third and fourth diodes D3 and D4.

Each of the secondary coil L2 and the tertiary coil L3 of the transformer TF may be induction-coupled to the primary coil L1, and the secondary and tertiary coils L2 and L3 may each have a winding ratio according to a predetermined voltage to output ratio.

As the first switching element SW1 and the second switching element SW2 may be alternately turned on and off, a voltage may be induced to the secondary coil L2 and the tertiary coil L3, and output voltages of a specific voltage value, for example, the first standby voltage Vs1 and the second standby voltage Vs2, may each be output through the first output portion 41-3 and the second output portion 41-4, respectively.

A first capacitor C1 may be connected between both output nodes or terminals of the first output portion 41-3, and may store the first standby voltage Vs1. Furthermore, a dummy resistor R and a third switching element SW3 may be serially connected to each other between both output nodes. The third switching element SW3 may be turned on or off based on a control signal $V_A$ provided from the controller 42, and when the third switching element SW3 may be turned on, a current flows through the dummy resistor R. Therefore, the first standby voltage Vs1 may not be lowered or not increased to a voltage more than a certain voltage.

In the standby state, as a reference electric potential of the control signal $V_A$ received from the controller 42 may be different from a reference electric potential of the first output portion 41-3, a photocoupler PC may convert the control signal $V_A$ to correspond to a reference electric potential of the second output portion 41-4 and apply the converted control signal $V_{A'}$ to the third switching element SW3.

A second capacitor C2 may be connected between both output nodes of the second output portion 41-4, and may store the second standby voltage Vs2.

The configuration and operation of the conversion circuit 41 are not limited to the above description, and the conversion circuit 41 may be implemented as various types of circuits having an insulation type SMPS structure.

The controller 42 may sense the first standby voltage Vs1 and the second standby voltage Vs2 that are generated in the conversion circuit 41, and control a switching operation of the switching portion 41-1 based on a sensing result.

The controller 42 may include an operation mode setting circuit 42-1, a feedback circuit 42-2, and a switching controller 42-3. In one or more embodiments, each of the operation mode setting circuit 42-1, the feedback circuit 42-2, and the switching controller 42-3 may be implemented as a semiconductor chip. In one or more embodiments, at least part of the operation mode setting circuit 42-1, the feedback circuit 42-2, and the switching controller 42-3 may be implemented as one semiconductor chip.

The operation mode setting circuit 42-1 may set an operation mode of the second converter 114 based on the standby mode signal STBY and the second standby voltage Vs2.

FIG. 5 is a table for describing an example of a method of setting an operation mode in the operation mode setting circuit of FIG. 4.

Referring to FIG. 5, when the standby mode signal STBY is the logic high level H indicating the normal mode state, the operation mode setting circuit 42-1 may be set to perform a normal mode operation NR regardless of a voltage level of the second standby voltage Vs2, and output an operation mode signal OMD of the logic low level L indicating the normal mode operation NR.

When the standby mode signal STBY is the logic low level L indicating the standby mode state, the operation mode setting circuit 42-1 may sense the second standby voltage Vs2, and when the second standby voltage Vs2 is greater than a certain reference voltage (e.g., set to be the logic high level H), the operation mode setting circuit 42-1 may be set to perform a standby mode operation STB, and output the operation mode signal OMD of the logic high level H indicating the standby mode operation STB.

When the standby mode signal STBY is the logic low level L indicating the standby mode state, and the second standby voltage Vs2 is a certain reference voltage or less (e.g., set to be the logic low level L), the operation mode setting circuit 42-1 may be set to perform the normal mode operation NR, and output the operation mode signal OMD of the logic low level L indicating the normal mode operation NR. In this case, the control signal $V_A$ of the logic high level H may be output, and the third switching element SW3 may be turned on in response to the control signal $V_A$.

As described above, when the standby mode signal STBY indicates the normal mode state, regardless of a voltage level of the second standby voltage Vs2, the second converter 114 may be set to perform the normal mode operation NR. In the case in which the standby mode signal STBY indicates the standby mode state, when a voltage level of the second standby voltage Vs2 is greater than a certain reference voltage, the second converter 114 may be set to perform the standby mode operation STB, and when the voltage level of the second standby voltage Vs2 is a certain reference voltage or less, the second converter 114 may be set to perform the normal mode operation NR. Accordingly, in the standby mode state, when the second standby voltage Vs2 is lowered to a certain reference voltage or less, the standby mode state may be forcibly released (e.g., operation mode is switched from standby mode to normal mode).

Referring to back FIG. 4, the feedback circuit 42-2 may sense the first standby voltage Vs1 and generate a control voltage Vc to control the rising and falling of the first standby voltage Vs1.

The switching controller 42-3 may receive the operation mode signal OMD and the control voltage Vc and may be operated based thereon. The switching controller 42-3 may generate the switching signals M1 and M2 provided to the switching portion 41-1 of the conversion circuit 41, and adjust a frequency (e.g., modulation frequency) or a duty ratio (e.g., modulation width) of the switching signals M1 and M2, based on the control voltage Vc. For example, when the control voltage Vc indicates the falling of the first standby voltage Vs1, the switching controller 42-3 may increase the frequencies or duty ratios of the switching signals M1 and M2.

The switching controller 42-3 may perform the normal mode operation or the standby mode operation in response to the operation mode signal OMD. For example, during the normal mode operation, the switching controller 42-3 may generate the switching signals M1 and M2 to continuously switch the switching elements SW1 and SW2 of the switching portion 41-1. For example, the levels of the switching signals M1 and M2 may be continuously shifted between the logic high level H and the logic low level L, and the levels of the first switching signal M1 and the second switching signal M2 may be complementarily shifted.

During the standby mode operation, the switching controller 42-3 may generate the switching signals M1 and M2 to allow the switching elements SW1 and SW2 of the switching portion 41-1 to intermittently switch. For example, the levels of the switching signals M1 and M2 may be intermittently shifted between the logic high level H and the logic low level L. For example, the levels of the switching signals M1 and M2 may be shifted between the logic high level H and the logic low level L periodically for a certain period.

During the normal mode operation and the standby mode operation, the switching controller 42-3 may control the rising or falling of the first standby voltage Vs1 based on the control voltage Vc, as described above.

Figure 6A:
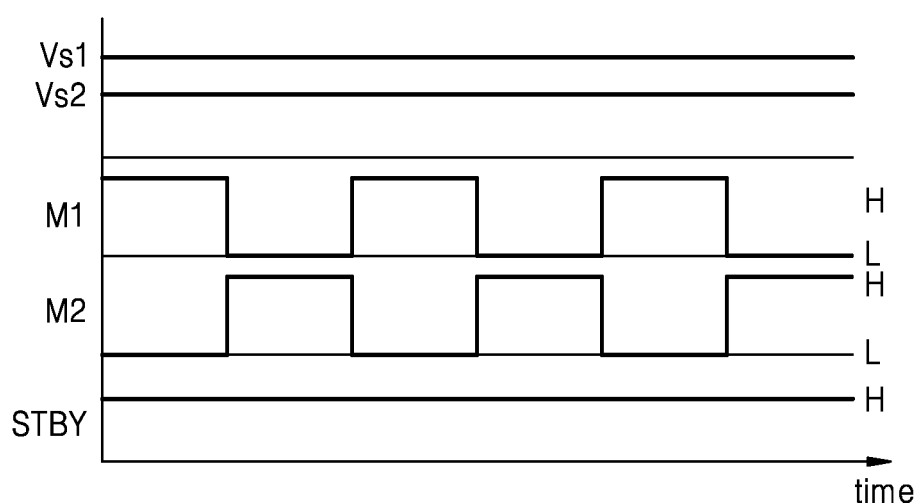
FIGS. 6A and 6B are timing diagrams of a normal mode operation and a standby mode operation of the second converter, according to an embodiment of the present disclosure.
Figure 6B:
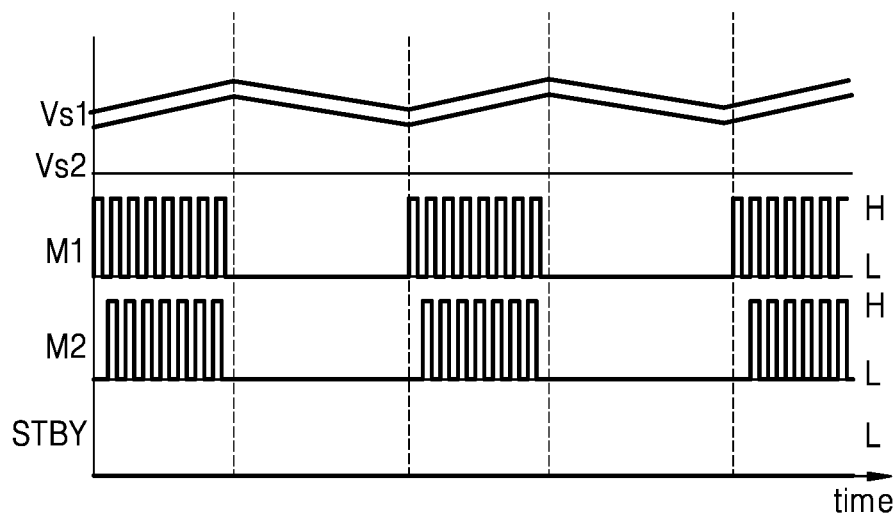

FIGS. 6A and 6B are timing diagrams of a normal mode operation and a standby mode operation of the second converter.

FIG. 6A shows the normal mode operation, and FIG. 6B shows the standby mode operation.

Referring to FIGS. 4 and 6A, when the standby mode signal STBY is the logic high level H, the second converter 114 may perform a normal mode operation. The switching controller 42-3 may generate the first switching signal M1 and the second switching signal M2 that are continuously shifted between the logic high level H and the logic low level L.

The switching elements SW1 and SW2 of the switching portion 41-1 may continuously perform a switching operation in response to the first switching signal M1 and the second switching signal M2, and thus, the first standby voltage Vs1 and the second standby voltage Vs2 of constant voltage levels may be generated.

Referring to FIGS. 4 and 6B, when the standby mode signal STBY is the logic low level L, and the second standby voltage Vs2 is not lowered equal to or less than a certain reference voltage, the second converter 114 may perform a standby mode operation. The switching controller 42-3 may generate the first switching signal M1 and the second switching signal M2 that are intermittently shifted between the logic high level H and the logic low level L. The frequencies of the first switching signal M1 and the second switching signal M2 may be identical or similar to the frequencies of the first switching signal M1 and the second switching signal M2 of FIG. 6A.

The switching elements SW1 and SW2 of the switching portion 41-1 may intermittently perform a switching operation in response to the first switching signal M1 and the second switching signal M2. When the second converter 114 performs a standby mode operation, the amount of load currents based on the first standby voltage Vs1 and the second standby voltage Vs2 may be small compared to the normal mode operation. Accordingly, when the switching elements SW1 and SW2 perform a switching operation in response to the first switching signal M1 and the second switching signal M2, the first standby voltage Vs1 and the second standby voltage Vs2 may be gradually increased. Subsequently, when the switching elements SW1 and SW2 stop the switching operation in response to the first switching signal M1 and the second switching signal M2, the first standby voltage Vs1 and the second standby voltage Vs2 may be gradually decreased.

Figure 7:
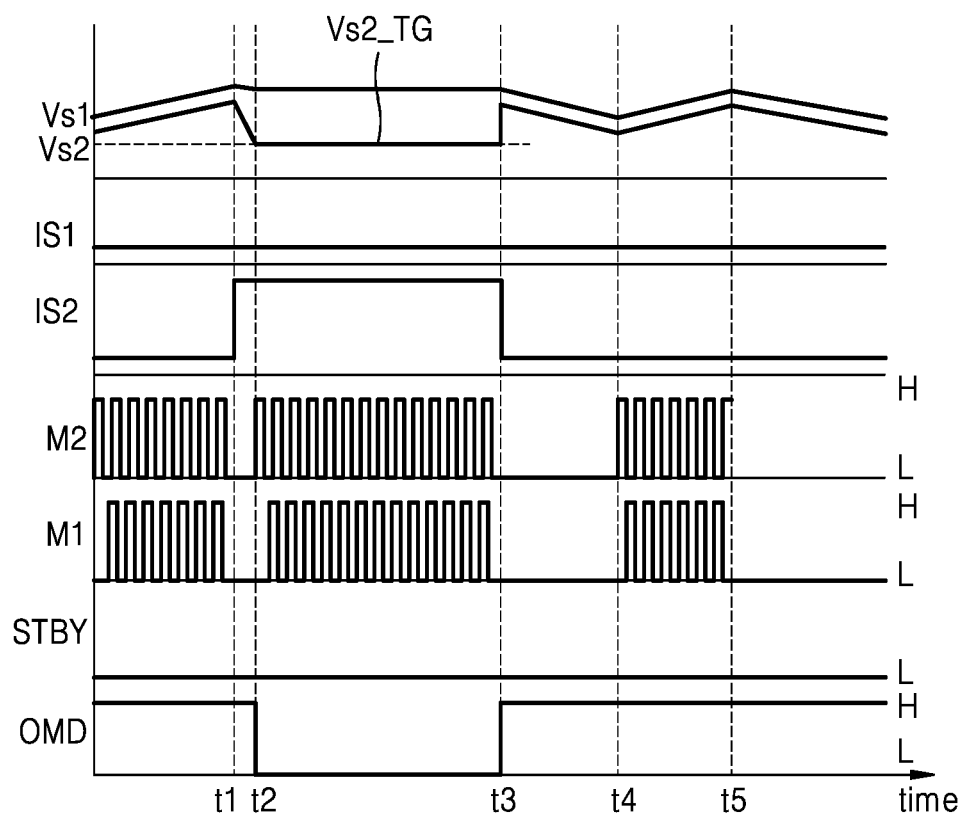
FIG. 7 is a timing diagram of the operation of the second converter in a standby mode state, according to an embodiment of the present disclosure.

FIG. 7 is a timing diagram of the operation of the second converter in the standby mode state, according to one or more embodiments.

Referring to FIGS. 4 and 7, when the standby mode signal STBY is the logic low level L, the second converter 114 may enter the standby mode state. In this case, as described with reference to FIGS. 4 and 6B, the operation mode may be set based on the second standby voltage Vs2. When the second standby voltage Vs2 is greater than a certain reference voltage, a mode signal OMD may be the logic high level H, and the second converter 114 may perform a standby mode operation. The switching portion 41-1 may perform a switching operation in response to the first and second switching signals M1 and M2. A first load current Is1 and a second load current Is2 may be load currents of an operation module that operates based on the first standby voltage Vs1 and the second standby voltage Vs2, respectively. When the first load current Is1 and the second load current Is2 are small (e.g., first load current Is1 and the second load current Is2 are below a current threshold), the first standby voltage Vs1 and the second standby voltage Vs2 may be gradually increased. The first standby voltage Vs1 and the second standby voltage Vs2 may be gradually increased until a time point t1, and at the time point t1, the second load current Is2 may be increased. In this state, when the switching operation stops after the time point t1 as the second converter 114 performs the standby mode operation, the second standby voltage Vs2 may fall.

When the second standby voltage Vs2 falls equal to or less than a certain reference voltage, the operation mode may be changed. The mode signal OMD may be changed from the logic high level L to the logic low level L, and the second converter 114 may perform a normal mode operation in response to the mode signal OMD.

The switching portion 41-1 may continuously perform the switching operation in response to the first and second switching signals M1 and M2. In this state, as the value of the second load current Is2 is large (e.g., second load current Is2 is above a current threshold), the second standby voltage Vs2 may maintain a constant voltage. For example, the second standby voltage Vs2 may maintain a target voltage Vs2_TG.

Furthermore, as described above with reference to FIG. 4, the control signal $V_A$ is the logic high level H, the third switching element SW3 provided in the first output portion 41-3 is turned on in response to the control signal $V_A$, and a current flows through the dummy resistor R. Accordingly, the first standby voltage Vs1 is not increased and may maintain a constant voltage.

Subsequently, when the second load current Is2 is decreased at a time point t3, the second standby voltage Vs2 may be instantly increased, and as the second standby voltage Vs2 is greater than a certain reference voltage, the mode signal OMD may be shifted to the logic high level H, and the second converter 114 may perform the standby mode operation in response to the mode signal OMD.

The second converter 114 may intermittently perform the switching operation, and the first standby voltage Vs1 and the second standby voltage Vs2 may be gradually decreased in a period in which the switching operation is not performed (e.g., periods between the time point t3 to a time point t4 and after a time point t5), and the first standby voltage Vs1 and the second standby voltage Vs2 may be gradually increased in a period in which the switching operation is performed (e.g., a period between the time point t4 to the time point t5).

As described with reference to FIG. 7, in the standby mode state, when the second standby voltage Vs2 falls equal to or less than a reference voltage due to the increase of the second load current Is2, the second converter 114 may perform the normal mode operation, and thus, the second standby voltage Vs2 may maintain a constant voltage. As the current flows through the dummy resistor R of the first output portion 41-3 from which the first standby voltage Vs1 is output, the second standby voltage Vs12 may further maintain a constant voltage.

In the standby mode state, even when the second converter 114 performs the normal mode operation, the power factor corrector (112 of FIG. 2) and the first converter (113 of FIG. 2) may maintain the standby mode state, and may not be operated. For example, in the standby mode state, the power voltage to the power factor corrector 112 and the first converter 113 may be cut off, and thus, the power factor corrector 112 and the first converter 113 may not be operated.

Figure 8:
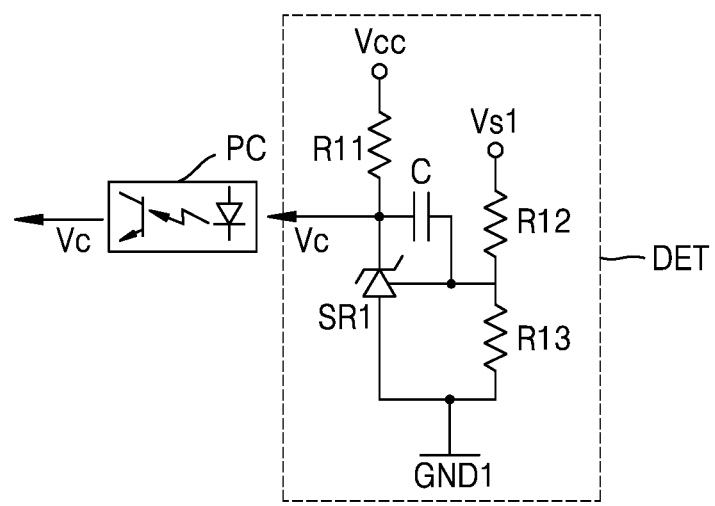
FIG. 8 is a circuit diagram of an example of a feedback circuit of FIG. 4, according to an embodiment of the present disclosure.

FIG. 8 is a circuit diagram of one example of the feedback circuit of FIG. 4.

Referring to FIG. 8, the feedback circuit 42-2 may include a detection circuit DET and the photocoupler PC. The detection circuit DET may include a shunt regulator SR1, resistors R11, R12, and R13, and a capacitor C, and may sense the first standby voltage Vs1 based on a power voltage Vcc. The distribution resistors R12 and R13 voltage-distribute the first standby voltage Vs1, and the detection circuit DET may be operated as an integrator based on the distributed voltage. The control voltage Vc indicating the rising or falling of the first standby voltage Vs1 may be output.

In one or more embodiments, the reference electric potential of the first standby voltage Vs1 may be a first ground GND1, and the detection circuit DET may be connected to the first ground GND1. The first ground GND1 may be different from the ground of the switching controller (42-3 of FIG. 4) to which the control voltage Vc is applied. For example, the switching controller 42-3 may be earth grounded. In one or more examples, the first ground GND1 may be connected to a ground that is different than the earth ground. The photocoupler PC may convert the control voltage Vc to correspond to the reference electric potential, for example, the earth ground, of the switching controller 42-3 and provide the converted control voltage Vc, to the switching controller 42-3.

Figure 9A:
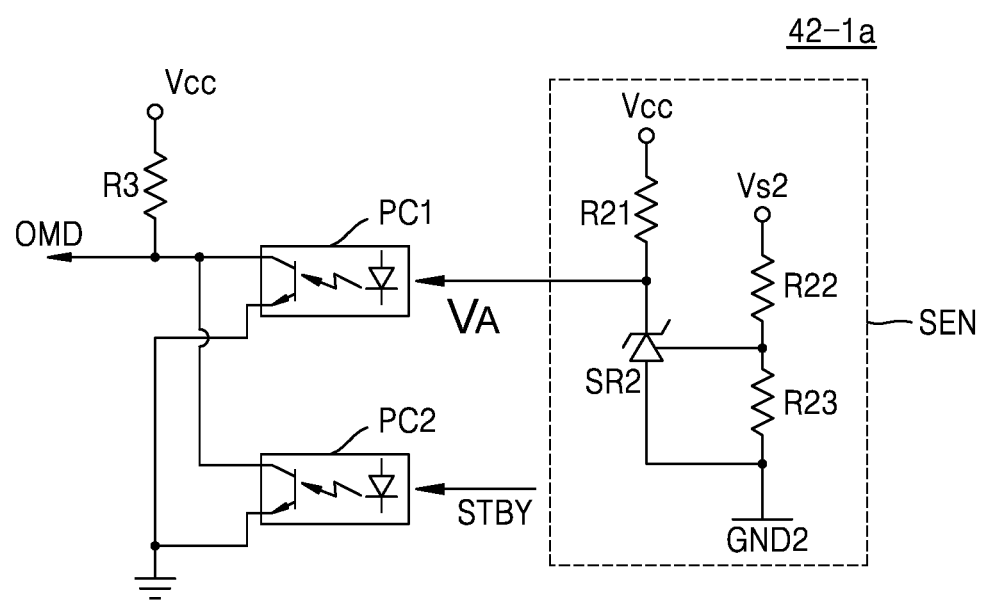
FIGS. 9A and 9B are circuit diagrams of examples of an operation mode setting circuit, according to an example embodiment of the present disclosure.
Figure 9B:
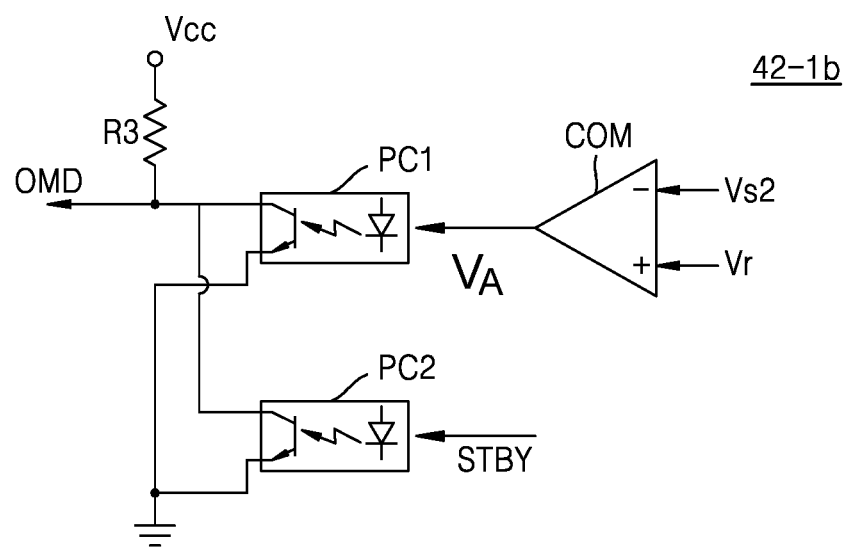

FIGS. 9A and 9B are circuit diagrams of examples of an operation mode setting circuit according to one or more embodiments of the present disclosure.

The operation mode setting circuit of FIGS. 9A and 9B may be employed as the operation mode setting circuit 42-1 of FIG. 4.

FIG. 9A illustrates, according to an embodiment, a configuration of an operation mode setting circuit 42-1a. The operation mode setting circuit 42-1a may include a sensing circuit SEN, first and second photocouplers PC1 and PC2, and a resistor R3, and the sensing circuit SEN may include a shunt regulator SR2, and resistors R21, R22, and R23.

The sensing circuit SEN may sense the second standby voltage Vs2 based on the power voltage Vcc. The distribution resistors R22 and R23 may voltage-distribute the second standby voltage Vs2, and when the distributed voltage is greater than a threshold voltage of the shunt regulator SR2, the control signal $V_A$ of the logic low level L may be output, and when the distributed voltage is less than the threshold voltage of the shunt regulator SR2, the control signal $V_A$ of the logic high level H may be output.

In one or more embodiments, the reference electric potential of the second standby voltage Vs2 may be a second ground GND2, and the sensing circuit SEN may be connected to the second ground GND2. The control signal $V_A$ may be converted to a signal based on the earth ground through the first photocoupler PC1.

The earth ground may be connected to one end of each of the first and second photocouplers PC1 and PC2, and the power voltage Vcc may be applied to the other end thereof through the resistor R3. When at least one of the control signal $V_A$ or the standby mode signal STBY is the logic high level H, the mode signal OMD of the logic low level L indicating the normal mode operation may be output, and when the control signal $V_A$ and the standby mode signal STBY are all the logic low level L, the mode signal OMD of the logic high level H indicating the standby mode operation may be output.

In the normal mode state, as the standby mode signal STBY is the logic high level H, the mode signal OMD may indicate the normal mode operation.

In the standby mode state, as the standby mode signal STBY is the logic low level L, the mode signal OMD may be set depending on the control signal $V_A$. When the second standby voltage Vs2 is greater than a certain reference voltage, the control signal $V_A$ of the logic low level L may be output, and the mode signal OMD of the logic high level H indicating the standby mode operation may be output. When the second standby voltage Vs2 is equal to or less than a certain reference voltage, the control signal $V_A$ of the logic high level H may be output, and the mode signal OMD of the logic low level L indicating the normal mode operation may be output.

FIG. 9B illustrates, according to an embodiment, a configuration of an operation mode setting circuit 42-1b. The operation mode setting circuit 42-1b of FIG. 9B may be a modified example of the operation mode setting circuit 42-1a of FIG. 9A, where the sensing circuit SEN may be replaced with a comparator COM. The comparator COM may output the control signal $V_A$ of the logic low level L when the second standby voltage Vs2 is greater than a certain reference voltage (e.g., a comparison voltage Vr), and the control signal $V_A$ of the logic high level H when the second standby voltage Vs2 is greater than the certain reference voltage (e.g., the comparison voltage Vr).

Figure 10:
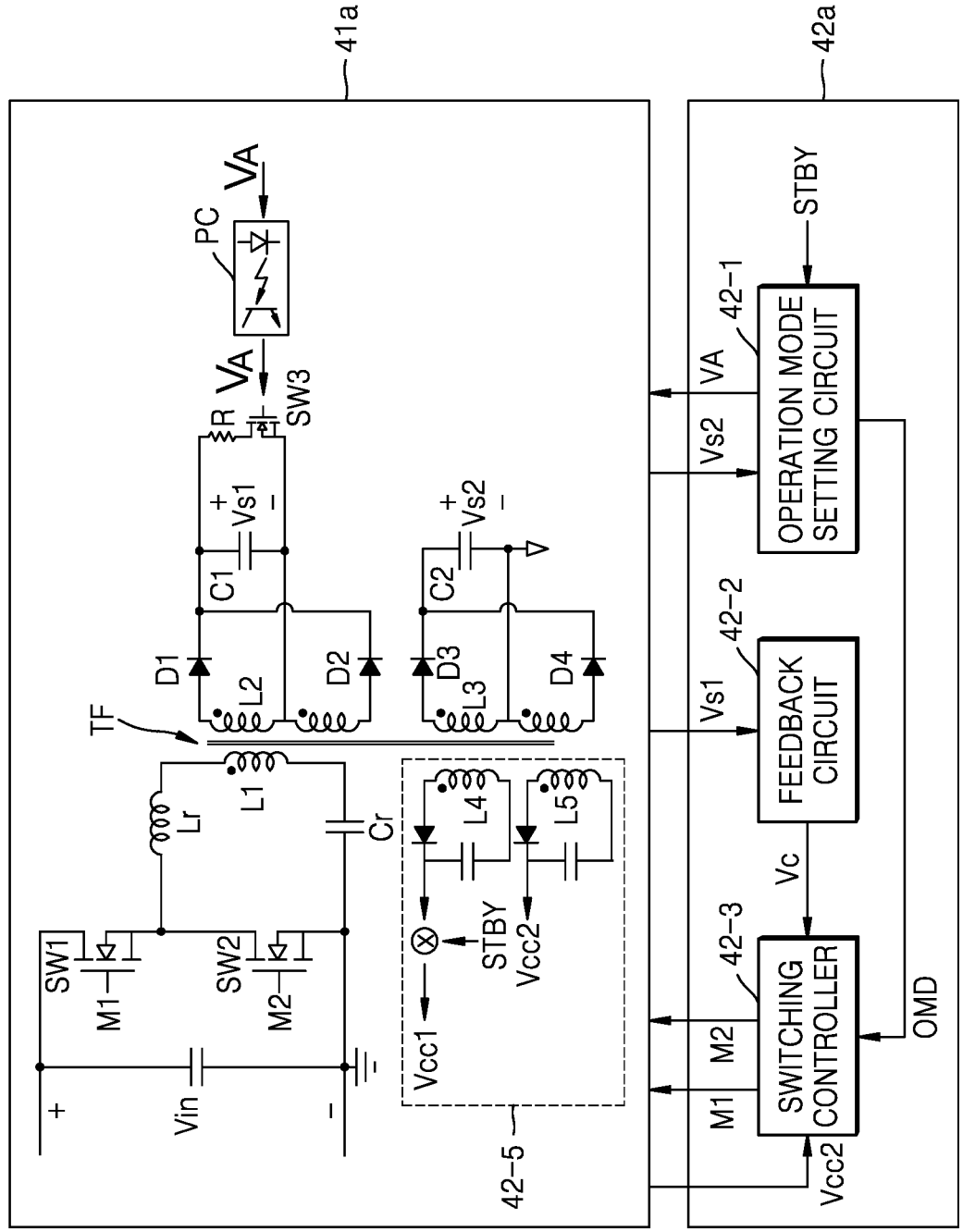
FIG. 10 illustrates a second converter, according to an example embodiment of the present disclosure.

FIG. 10 illustrates a second converter, according to an example embodiment of the present disclosure.

A second converter 114a may be applied to the power generation module 110 of FIG. 2. The second converter 114a may be a modified example of the second converter 114 of FIG. 4. Accordingly, differences from the second converter 114 of FIG. 4 are mainly described.

Compared with the second converter 114 of FIG. 4, the second converter 114a may further include a power voltage generation portion 42-5. A fourth coil L4 and a fifth coil L5 may each be induction-coupled to the primary coil L1, and the fourth and fifth coils L4 and L5 may each have a winding ratio according to a power voltage to output.

The power voltage generation portion 42-5 may generate a first power voltage Vcc1 according to a winding ratio of the primary coil L1 and the fourth coil L4, and a second power voltage Vcc2 according to a winding ratio of the primary coil L1 and the fifth coil L5. In one or more embodiments, the voltage levels of the first power voltage Vcc1 and the second power voltage Vcc2 may be the same.

The first power voltage Vcc1 may be provided to the power factor corrector (112 of FIG. 2) and the first converter (113 of FIG. 2). In the normal mode state, where the standby mode signal STBY is the logic high level H, the first power voltage Vcc1 may be provided to the power factor corrector 112 and the first converter 113, and the power factor corrector 112 and the first converter 113 may be operated.

In the standby mode state, where the standby mode signal STBY is the logic low level L, the first power voltage Vcc1 may be cut off. Accordingly, the power factor corrector 112 and the first converter 113 may be in an off state (e.g., a standby mode state).

In one or more embodiments, in the standby mode state, even when the operation mode signal OMD indicates a normal operation mode and the second converter 114a accordingly performs a normal mode operation, the standby mode signal STBY is the logic low level L, the first power voltage Vcc1 is cut off, and the power factor corrector 112 and the first converter 113 may maintain an off state (e.g., a standby mode state).

The second voltage Vcc2 may be generated regardless of a mode state, for example, the standby mode state or the normal mode state, and an operation mode, for example, the normal mode operation or the standby mode operation, and provided to the switching controller 42-3. The second power voltage Vcc2 may also be provided to the feedback circuit 42-2 and the operation mode setting circuit 42-1 as a voltage (e.g., Vcc of FIGS. 8 to 9B).

Figure 11:
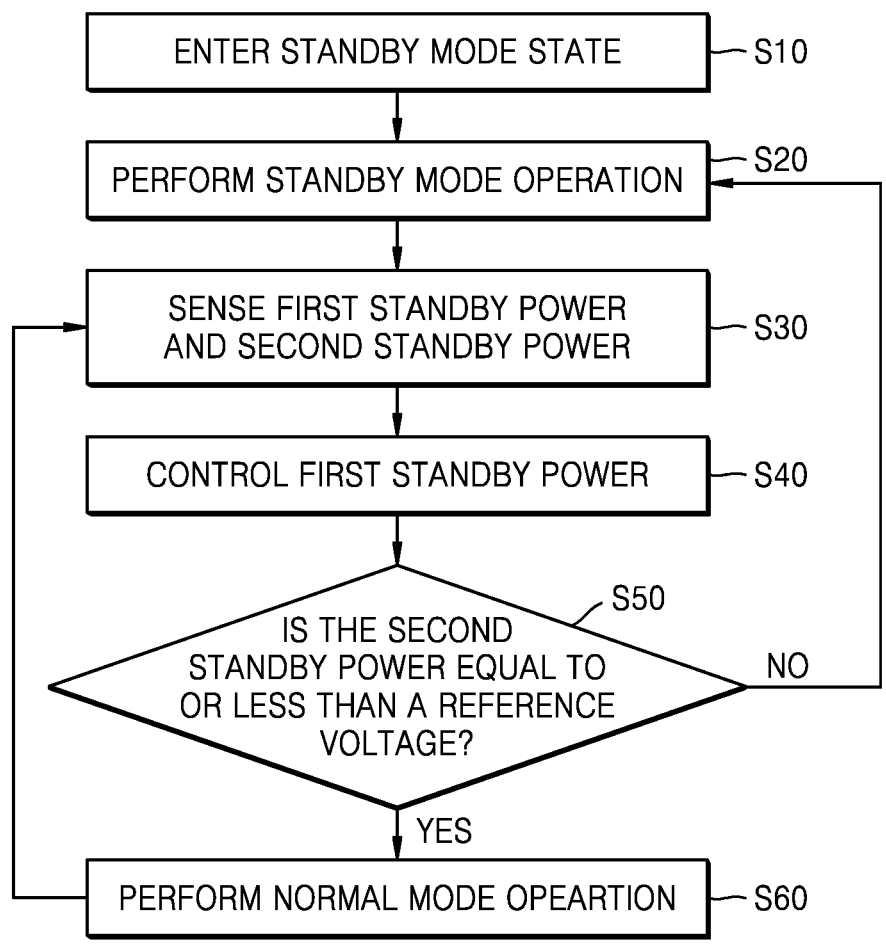
FIG. 11 shows a standby mode performing method of a power supply apparatus, according to an example embodiment of the present disclosure.

FIG. 11 shows a standby mode performing method of a power supply apparatus according to an example embodiment of the present disclosure.

The method of FIG. 11 may be performed in a standby power generation circuit for generating standby power, for example, the second converter 114 of FIG. 2.

Referring to FIG. 11, the power supply apparatus may enter a standby mode state at operation (S10). The power supply apparatus may enter a standby mode state in response to a standby mode signal that is internally or externally generated. For example, when an electronic device to which the power supply apparatus provides power is powered off or enters a sleep state, the power supply apparatus may enter a standby mode state.

The power supply apparatus may perform a standby mode operation at operation (S20). The power supply apparatus may generate at least two standby voltages, for example, a first standby voltage and a second standby voltage. The power supply apparatus may include an SMPS that generates the first standby voltage and the second standby voltage, and the SMPS may intermittently perform a switching operation.

The power supply apparatus may sense the first standby voltage and the second standby voltage at operation (S30). For example, the power supply apparatus may include a controller for controlling the SMPS, and the controller may sense the first standby voltage and the second standby voltage.

The power supply apparatus may control the first standby voltage at operation (S40). The power supply apparatus may control the rising and falling of the first standby voltage based on the sensed first standby voltage. For example, to prevent the first standby voltage from falling equal to or less than a certain lower limit voltage or rising over a certain upper limit voltage, while sensing the first standby voltage, the power supply apparatus may control (e.g., adjust) the first standby voltage.

The power supply apparatus may determine whether the second standby voltage is equal to or less than a reference voltage at operation (S50). The power supply apparatus may determine whether the sensed second standby voltage falls equal to or less than a certain reference voltage. For example, when power consumption is large because a driving current of a function unit to which the second standby voltage is provided is large, the second standby voltage may fall equal to or less than a reference voltage.

The power supply apparatus may perform a normal mode operation when the second standby voltage is determined to be a reference voltage or less at operation (S60). The SMPS may continuously perform a switching operation, and accordingly, the second standby voltage may be maintained constant at a target level. In one or more embodiments, in the standby mode state, when the power supply apparatus performs a normal mode operation, an output terminal for generating first standby voltage may be controlled so that a certain current flows in the output terminal. Accordingly, the first standby voltage may be maintained at a constant level without rising.

When the second standby voltage is not determined to be a reference voltage or less (e.g., the second standby voltage exceeds the reference voltage), the method may return to operation (S20), where the power supply apparatus may continuously perform the standby mode operation.

The power supply apparatus may continuously perform S20 to S50 until entering a normal mode state in response to the standby mode signal. Accordingly, in the standby mode state, the first standby voltage and the second standby voltage may be prevented from excessively rising or falling.

Figure 12:
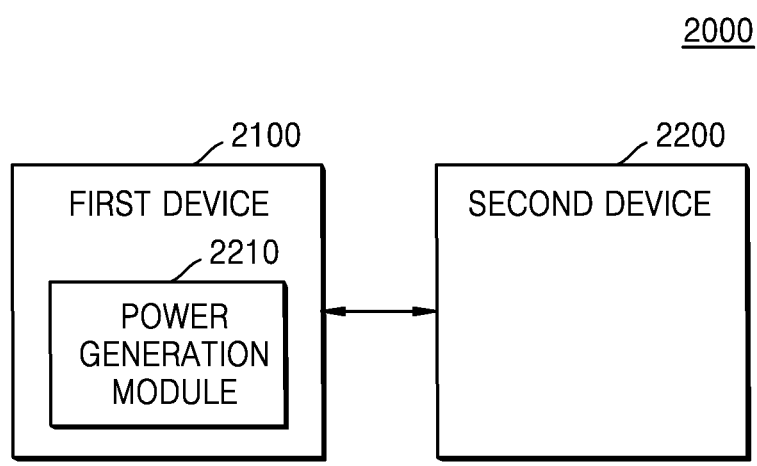
FIG. 12 is a block diagram of an electronic device, according to an example embodiment of the present disclosure.

FIG. 12 is a block diagram of an electronic device, according to an example embodiment of the present disclosure.

Referring to FIG. 12, an electronic device 2000 may include a first device 2100 and a second device 2200, and the first device 2100 and the second device 2200 may be electrically connected to each other. The first device 2100 may include a power generation module 2210.

For example, the power generation module 110 of FIG. 2 may be employed as the power generation module 2210. The power generation module 2210 may generate at least two standby voltages. The first device 2100 may provide one or more standby voltages of the at least two standby voltages to the second device 2200. The second device 2200 may be operated based on one or more standby voltages received from the first device 2100, in the standby mode state. For example, in the standby mode state, functions of the first device 2100 may be deactivated, and some functions to receive a user input to instruct escaping from the standby mode state may be in an active state.

The first device 2100 may internally use the other standby voltage of the at least two standby voltages or provide the other standby voltage to other external devices.

The power generation module 2210 may generate the at least two standby voltages with less power consumption by performing a standby mode operation in the standby mode state. In this state, the power generation module 2210 may sense the standby voltage (e.g., Vs2) set to be the master (referred to as master standby voltage) of the at least two standby voltages, and control rising or falling of the master standby voltage.

The other standby voltage, except the master standby voltage, of the two standby voltages generated in the power generation module 2210 may be set to be a slave standby voltage. The power generation module 2210 may sense the slave standby voltage, and when the slave standby voltage is greater than a certain reference level, switch an operation mode and perform a normal mode operation. For example, the power generation module 2210 in the standby mode state may be forcibly switched to a normal mode state.

However, entering the normal mode state based on the level of the standby voltage may be different from entering a normal mode state based on the mode control signal, and the first device 2100 may maintain the standby mode state.

The power generation module 2210 (or some blocks of the power generation module) may be switched to the normal mode state. The power generation module 2210 may perform a normal mode operation, and the at least two standby voltages may maintain constant levels. The power generation module 2210 may continuously sense the master standby voltage and the slave standby voltage, and when the slave standby voltage is greater than a certain reference level, switch the operation mode and perform a standby mode operation. For example, the power generation module 2210 (or some blocks of the power generation module) may be switched back to the standby mode state. Accordingly, the power generation module 2210 in the standby mode state may generate the at least two standby voltages at less power consumption, and the at least two standby voltages may be prevented from excessively rising or falling.

The terms "module," "portion," or "member" stated in the specification may include a unit embodied by hardware, software, or firmware, and may be interchangeably used with terms, for example, logic, a logic block, a component, or a circuit. The module may be an integrally composed part or the smallest unit or part thereof that performs one or more functions. For example, according to one or more embodiments of the disclosure, the module may be embodied in the form of an application-specific integrated circuit (ASIC).

According to various embodiments of the present disclosure, each (e.g., a module or program) of the above-described constituent elements may include a single object or a plurality of objects. According to various embodiments, one or more constituent elements or operations of the above-described constituent elements may be omitted, or one or more other constituent elements or operations may be added. Substantially or additionally, a plurality of constituent elements (e.g., a module or program) may be integrated into one constituent element. In this case, the integrated constituent element may perform one or more functions of each of the plurality of constituent elements in the same or similar manner as that performed by the corresponding constituent element of the plurality of constituent elements prior to the integration. According to various embodiments, operations performed by a module, a program, or other constituent element are sequentially, parallel, repetitively, or heuristically executed, or one or more of the operations may be executed in a different order, or omitted, or one or more other operations may be added.

While embodiments of the disclosure have been particularly shown and described using specific terminologies, the embodiments and terminologies should be considered in descriptive sense only and not for purposes of limitation. Therefore, it will be understood by those of ordinary skill in the art that various changes in form and details may be made therein without departing from the spirit and scope of the disclosure as defined by the following claims.

What is claimed is:

1. An electronic device comprising:
   a power supply apparatus comprising:
      a first converter configured to generate driving power; and
      a second converter configured to generate first standby voltage and second standby voltage; and
   a main body configured to be operated based on the driving power and the second standby voltage received from the power supply apparatus,
   wherein the second converter is further configured to:
      during a normal mode operation and a standby mode operation, obtain the first standby voltage and adjust the first standby voltage based on the obtained standby voltage,
      during the standby mode operation, obtain the second standby voltage, and
      in response to the obtained second standby voltage being equal to or less than a reference level, perform the normal mode operation to control the first standby voltage to be maintained at a first voltage level and control the second standby voltage to be maintained at a second voltage level.

2. The electronic device of claim 1, wherein the second converter is further configured to obtain the second standby voltage during the normal mode operation in a standby mode state, and in response to the obtained second standby voltage being greater than the reference level, switch from the normal mode operation to the standby mode operation.

3. The electronic device of claim 1, wherein the second converter is further configured to:
   generate the first standby voltage based on a first ground; and
   generate the second standby voltage based on second ground, and
   wherein the second ground is different from the first ground and earth ground.

4. The electronic device of claim 1, wherein the main body is further configured to perform a voice recognition function based on the second standby voltage in a standby mode state.

5. The electronic device of claim 1, wherein the main body is further configured to extract a power-on command from a voice of a user by performing a voice recognition function based on the second standby voltage in which the main body is in a power off state, and
   wherein the main body is powered on based the power-on command.

6. The electronic device of claim 1, wherein the power supply apparatus further comprises:
   a main module configured to be operated based on the first standby voltage and output a standby mode signal indicating a standby mode state when the main body is powered off.

7. The electronic device of claim 6, wherein the first converter is further configured to:
   based on the standby mode signal, enter the standby mode state in which the driving power is not generated, and
   maintain the standby mode state while the second converter performs the normal mode operation based on a result of the obtained second standby voltage.

8. The electronic device of claim 6, wherein the main module is further configured to receive an input signal from an external device and provide the input signal to the main body.

9. The electronic device of claim 1, wherein the second converter comprises a conversion circuit configured to generate the first standby voltage and the second standby voltage based on switching operations of at least two switching elements, and
   wherein the second converter is further configured to:
      control the at least two switching elements to continuously perform the switching operations during the normal mode operation, and
      control the at least two switching elements to intermittently perform the switching operations during the standby mode operation.

10. The electronic device of claim 1, wherein the second converter comprises an output portion comprising first and second terminals and a resistor is connected between the first and second terminals,
    wherein the output portion is configured to output the first standby voltage through the first and second terminals, and
    wherein, in response to the second standby voltage being greater than the reference level, a current flows via the resistor.

11. The electronic device of claim 1, wherein the main body comprises:
    a display;
    a power circuit portion configured to convert the driving power received from the power supply apparatus, and output the converted driving power;
    a driving module configured to control driving of the display based on the converted driving power; and
    a main module configured to be operated based on the converted power or the second standby voltage.

12. The electronic device of claim 1, wherein the power supply apparatus is configured to provide, to the main body, the driving power, the second standby voltage, and a signal received from an external device, via a cable.

13. A power supply apparatus comprises:
    a first converter configured to generate a driving voltage in a normal mode state, and stop one or more operations of the first converter in a standby mode state; and
    a second converter configured to:
       generate a first standby voltage and a second standby voltage by performance of a standby mode operation in the standby mode state,
       obtain the first standby voltage to control rising or falling of the first standby voltage,
       obtain the second standby voltage, and
       in response to the second standby voltage being equal to or less than a reference voltage, perform a normal mode operation.

14. The power supply apparatus of claim 13, wherein the second converter is further configured to generate the first standby voltage and the second standby voltage based on a first ground for the first standby voltage and a second ground for the second standby voltage, and
    wherein the first ground is different than the second ground.

15. The power supply apparatus of claim 13, further comprising a function module configured to:
    operate based on the second standby voltage;
    receive an input signal from a second external device through wired or wireless communication; and
    provide, to a first external device, the driving voltage, the second standby voltage, and the input signal via a cable, wherein the power supply apparatus is connected to a first ground and the first external device is connected to a second ground, and wherein the first ground is different than the second ground.

16. An electronic device comprising:
a power supply apparatus comprising:
   a first converter configured to generate driving power; and
   a second converter configured to generate first standby voltage and second standby voltage; and
a display device configured to be operated based on the driving power and the second standby voltage received from the power supply apparatus,
wherein the second converter further is configured to:
   during a normal mode operation and a standby mode operation, obtain the first standby voltage and adjust the first standby voltage based on the obtained standby voltage, and
   during the standby mode operation, obtain the second standby voltage, and
   in response to the obtained second standby voltage being equal to or less than a reference level, perform the normal mode operation to control the first standby voltage to be maintained at a first voltage level and control the second standby voltage to be maintained at a second voltage level.

17. The electronic device of claim 16, wherein the second converter is further configured to:
   obtain the second standby voltage during the normal mode operation in a standby mode state, and
   in response to the obtained second standby voltage being greater than the reference level, switch from the normal mode operation to the standby mode operation.

18. The electronic device of claim 16, wherein the second converter is further configured to:
   generate the first standby voltage based on a first ground; and
   generate the second standby voltage based on second ground, and
   wherein the second ground is different from the first ground and earth ground.

19. The electronic device of claim 16, wherein the display device is further configured to perform a voice recognition function based on the second standby voltage in the standby mode state.

20. The electronic device of claim 16, wherein the display device is further configured to extract a power-on command from a voice of a user by performing a voice recognition function based on the second standby voltage in which the display device is in a power off state, and
   wherein the display device is powered on based the power-on command.

* * * * *